US012597371B2

(12) United States Patent
Wang et al.

(10) Patent No.: US 12,597,371 B2
(45) Date of Patent: Apr. 7, 2026

(54) CONNECTING ASSEMBLY AND ASSEMBLED DISPLAY

(71) Applicant: TCL China Star Optoelectronics Technology Co., Ltd., Shenzhen (CN)

(72) Inventors: Min Wang, Shenzhen (CN); Yao Chen, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 1137 days.

(21) Appl. No.: 17/622,836

(22) PCT Filed: Dec. 16, 2021

(86) PCT No.: PCT/CN2021/138695
§ 371 (c)(1),
(2) Date: Jun. 15, 2023

(87) PCT Pub. No.: WO2023/102998
PCT Pub. Date: Jun. 15, 2023

(65) Prior Publication Data
US 2024/0036797 A1 Feb. 1, 2024

(30) Foreign Application Priority Data

Dec. 9, 2021 (CN) .......................... 202111501331.X

(51) Int. Cl.
*G09F 9/302* (2006.01)
*G06F 1/16* (2006.01)
(52) U.S. Cl.
CPC .......... *G09F 9/3026* (2013.01); *G06F 1/1647* (2013.01)

(58) Field of Classification Search
CPC ..... G09F 9/3026; H05K 5/30; G02F 1/13336; G06F 1/1654; G06F 1/1647
See application file for complete search history.

(56) References Cited

U.S. PATENT DOCUMENTS

| | | | | | |
|---|---|---|---|---|---|
| 5,600,910 | A | * | 2/1997 | Blackburn | .............. F21S 2/005 40/605 |
| 6,054,968 | A | * | 4/2000 | De Matteo | .......... G09F 15/0068 40/605 |
| 6,844,865 | B2 | * | 1/2005 | Stasko | ................... F16M 11/22 361/679.04 |
| 7,355,562 | B2 | * | 4/2008 | Schubert | .................. G09F 9/33 345/905 |
| 2019/0191574 | A1 | | 6/2019 | Kim et al. | |

FOREIGN PATENT DOCUMENTS

| | | |
|---|---|---|
| CN | 104299527 | 1/2015 |
| CN | 206819678 | 12/2017 |
| CN | 108107978 | 6/2018 |

(Continued)

*Primary Examiner* — James Wu

(57) ABSTRACT

The embodiment of this application discloses a connecting assembly and a assembled display, the connecting assembly comprises a first base provided with a first guiding structure, a second base provided with a second guiding structure, and a connecting member for locking the first base and the second base together, and the connecting member is provided with a first matching structure configured to match the first guiding structure and a second matching structure configured to match the second guiding structure.

18 Claims, 6 Drawing Sheets

(56) References Cited

FOREIGN PATENT DOCUMENTS

| | | |
|---|---|---|
| CN | 208796613 | 4/2019 |
| CN | 209926786 | 1/2020 |
| CN | 210777625 | 6/2020 |
| CN | 211455171 | 9/2020 |
| CN | 212135829 | 12/2020 |
| CN | 213339455 | 6/2021 |
| CN | 213635159 | 7/2021 |
| CN | 214175581 | 9/2021 |
| CN | 214888139 | 11/2021 |
| JP | 2003-015553 | 1/2003 |

* cited by examiner

130

120

CONNECTING ASSEMBLY AND ASSEMBLED DISPLAY

RELATED APPLICATIONS

This application is a National Phase of PCT Patent Application No. PCT/CN2021/138695 having International filing date of Dec. 16, 2021, which claims the benefit of priority of Chinese Patent Application No. 202111501331.X filed on Dec. 9, 2021. The contents of the above applications are all incorporated by reference as if fully set forth herein in their entirety.

FIELD AND BACGROUND OF THE INVENTION

The present disclosure relates to the technical field of displays, and in particular to a connecting assembly and assembled display.

With the continuous development of display technology, display applications are becoming more and more extensive, not only applied in TV, monitor, industrial display, medical display, it is also applied more and more in public display occasions. When it comes to the publicly displayed application, the monitor generally needs to have a larger display area to meet the requirements that people could watch the monitor from a distance and the monitor could display a larger amount of information. However, the regular size of liquid crystal display is 32 inches to 55 inches according to the current development status of liquid crystal display (LCD). If the display in this size range is applied in public display, the multi-screen assembly is needed.

When multiple screens are assembled together, the original frame of each display borders each other to form assembled seams, which can be clearly seen. Various panel manufacturers in the industry begin to overcome related technical problems, and reduce the physical frame of the display, in order to continuously reduce the seams. Currently, the mainstream seams in the industry are between 3.5 mm and 5.5 mm, and some high-end products or technology displays have even reached 1.4 mm.

When it comes to assembled screens, multiple screens are usually transported to the local site, and then multiple screens are assembled successively. In order to ensure the accuracy of assembly, workers need to confirm the positions of the screens repeatedly, and this will undoubtedly increase the complexity of the installation steps, resulting in low installation efficiency.

SUMMARY OF THE INVENTION

Technical Problem

The embodiments of the present disclosure provide a connecting assembly and an assembled display, it can solve the technical problems of complicated installation steps and low installation efficiency of existing splicing screens.

Technical Solutions

An embodiment of the present disclosure discloses a connecting assembly, comprising:

a first base provided with a first guiding structure;

a second base provided with a second guiding structure; and a connecting member configured to lock the first base and the second base together, wherein the connecting member is provided with a first matching structure configured to match the first guiding structure and a second matching structure configured to match the second guiding structure;

wherein in a locked state, the first guiding structure is toothedly connected to the first matching structure, and the second guiding structure is toothedly connected to the second matching structure; wherein in an unlocked state, the first guiding structure is separated from the first matching structure, and the second guiding structure is separated from the second matching structure.

When the assembly component of an embodiment of the present disclosure is used, the first base is fixed to the first display screen, and the second base is fixed to the second display screen. The first base and the second base can be locked together through a connecting member, such that the first display screen and the second display screen tightly assembled, which is beneficial to eliminate seams. The first display screen and the second display screen are not easy to shift, and workers do not need to repeatedly confirm the position, which effectively simplifies the installation process of the assembled display screen and improves Installation efficiency.

Optionally, in some embodiments of the present disclosure, the first guiding structure is a sliding rail, and the first matching structure is a sliding groove. In addition, wherein in a locked state, the first guiding structure is slidably connected to the first matching structure.

In the assembly component of an embodiment of the present disclosure, the first guiding structure is configured as a sliding rail and the first matching structure is configured as a sliding groove, such that the first guiding structure is slidably connected to the first matching structure. Under this structure, it is easy to assemble between the first base and the connecting member, and the structure is simple.

Optionally, in some embodiments of the present disclosure, the first guiding structure includes a first connecting portion and a first toothing portion, wherein the first connecting portion is connected to the first base, and the first toothing portion is connected to the first connecting portion, and a width of the first toothing portion is greater than a width of the first connecting portion;

wherein, the first mating structure includes a first toothing groove and a first connecting groove, the first toothing groove is configured to match the first toothing portion, and the first connecting groove is in communication with the first toothing groove, and the first connecting groove is configured to match the first connecting portion;

wherein in the locked state, the first toothing portion is inserted into the first toothing groove, and the first connecting portion is inserted into the first connecting groove.

In the assembly component of an embodiment of the present disclosure, wherein in the locked state, the first toothing portion is inserted into the first toothing groove, and the first connecting portion is inserted into the first connecting groove. Due to a width of the first toothing portion is greater than a width of the first connecting portion, the first toothing portion cannot move from the first toothing groove to the first connecting groove. This arrangement can prevent the first guiding structure from being separated from the first mating structure, and the reliability of the connecting assembly is effectively improved.

Optionally, in some embodiments of the present disclosure, the width of the first toothing portion is gradually expanded from the first connecting portion toward the first toothing portion, and the width of the first toothing groove is gradually expanded from the first connecting groove to the first toothing groove.

In the assembled component of an embodiment of the present disclosure, the first toothing portion cannot move from the first toothing groove to the first connecting groove, which can prevent the first guiding structure from being separated from the first mating structure, and the reliability of the connecting assembly is effectively improved.

Optionally, in some embodiments of the present disclosure, the first guiding structure is a sliding groove, the first matching structure is a sliding rail, and wherein in the locked state, the first matching structure is slidably connected to the first guiding structure.

In the assembly component of an embodiment of the present disclosure, the first guiding structure is configured as a sliding groove and the first mating structure is configured as a sliding rail, such that the first mating structure is slidably connected to the first guiding structure. Under this structure, it is easy to assemble between the first base and the connecting member, and the structure is simple.

Optionally, in some embodiments of the present disclosure, the first matching structure includes a first connecting portion and a first toothing portion, wherein the first connecting portion is connected to the first base, and the first toothing portion is connected to the first connecting portion, and a width of the first toothing portion is greater than a width of the first connecting portion;

wherein the first guiding structure includes a first toothing groove and a first connecting groove, the first toothing groove is configured to match the first toothing portion, and the first connecting groove is in communication with the first toothing groove, and the first connecting groove is configured to match the first connecting portion;

wherein in the locked state, the first toothing portion is inserted into the first toothing groove, and the first connecting portion is inserted into the first connecting groove.

In the assembly component of an embodiment of the present disclosure, in the locked state, the first toothing portion is inserted into the first toothing groove, and the first connecting portion is inserted into the first connecting groove. Due to the width of the first toothing portion is greater than the width of the first connecting portion, the first toothing part cannot move from the first toothing groove to the first connecting groove. This arrangement can prevent the first mating structure from detaching from the first guiding structure and the reliability of the connecting assembly is effectively improved.

Optionally, in some embodiments of the present disclosure, the width of the first toothing portion is gradually expanded from the first connecting portion toward the first toothing portion, and the width of the first toothing groove is gradually expanded from the first connecting groove to the first toothing groove.

In the assembled component of an embodiment of the present disclosure, the contact area between the first toothing portion and a side wall of the first toothing groove can be increased, which effectively prevents the first matching structure from being separated from the first guiding structure, and the reliability of the connecting assembly is improved.

Optionally, in some embodiments of the present disclosure, the second guiding structure is a sliding rail, the second matching structure is a sliding groove. In addition, wherein in the locked state, the second guiding structure is slidably connected to the second matching structure.

In the assembly component of an embodiment of the present disclosure, the second guiding structure is configured as a sliding rail and the second mating structure is configured as a sliding groove, such that the second guiding structure is slidably connected to the second mating structure. Under this structure, it is easy to assemble between the second base and the connecting member, and the structure is simple.

Optionally, in some embodiments of the present disclosure, the second guiding structure includes a second connecting portion and a second toothing portion, wherein the second connecting portion is connected to the second base, and the second toothing portion is connected to the second connecting portion, and a width of the second toothing portion is greater than a width of the second connecting portion;

wherein the second mating structure includes a second toothing groove and a second connecting groove, wherein the second toothing groove is configured to match the second toothing portion, and the second connecting groove is in communication with the second toothing groove, and the second connecting groove is configured to match the second connecting portion;

wherein in the locked state, the second toothing portion is inserted into the second toothing groove, and the second connecting portion is inserted into the second connecting groove.

In the assembly component of an embodiment of the present disclosure, wherein in the locked state, the second toothing portion is inserted into the second toothing groove, and the second connecting portion is inserted into the second connecting groove. Due to the width of the second toothing part is greater than the width of the second connecting portion, the second toothing part cannot move from the second toothing groove to the second connecting groove. This arrangement can prevent the second guiding structure from being separated from the second mating structure and the reliability of the connecting assembly is effectively improved.

Optionally, in some embodiments of the present disclosure, the width of the second toothing portion is gradually expanded from the second connecting portion toward the second toothing portion, and the width of the second toothing groove is gradually expanded from the second connecting groove to the second toothing groove.

In the assembled component of an embodiment of the present disclosure, the contact area between the second toothing portion and a side wall of the second toothing groove can be increased, which effectively prevents the second guiding structure from being separated from the second mating structure, and the reliability of the connecting assembly is improved.

In the assembled component of an embodiment of the present disclosure, the contact area between the second toothing portion and a side wall of the second toothing groove can be increased, which effectively prevents the second guiding structure from being separated from the second mating structure, and the reliability of the connecting assembly is improved.

In the assembly component of an embodiment of the present disclosure, the second guiding structure is configured as a sliding groove and the second matching structure is configured as a sliding rail, such that the second matching structure is slidably connected to the second guiding structure. Under this structure, it is easy to assemble between the second base and the connecting member, and the structure is simple.

Optionally, in some embodiments of the present disclosure, the second mating structure includes a second connecting portion and a second toothing portion, wherein the second connecting portion is connected to the second base, and the second tooth The engaging portion is connected to the second connecting portion, and a width of the second toothing portion is greater than a width of the second connecting portion;

wherein the second guiding structure includes a second toothing groove and a second connecting groove, the second toothing groove is configured to match the second toothing portion, and the second connecting groove is in communication with the second toothing groove, the second connecting groove is configured to match the second connecting portion;

wherein in the locked state, the second toothing portion is inserted into the second toothing groove, and the second connecting portion is inserted into the second connecting groove.

In the assembly component of an embodiment of the present disclosure, wherein in the locked state, the second toothing part is inserted into the second toothing groove, and the second connecting portion is inserted into the second connecting groove. Due to the width of the second toothing part is greater than the width of the second connecting portion, the second toothing part cannot move from the second toothing groove to the second connecting groove. This arrangement can prevent the second mating structure from being separated from the second guiding structure and the reliability of the connecting assembly is effectively improved.

Optionally, in some embodiments of the present disclosure, the width of the second toothing portion is gradually expanded from the second connecting portion toward the second toothing portion, and the width of the second toothing groove is gradually expanded from the second connecting groove to the second toothing groove.

In the assembled component of an embodiment of the present disclosure, the contact area between the second toothing portion and a side wall of the second toothing groove can be increased, which effectively prevents the second guiding structure from being separated from the second mating structure, and the reliability of the connecting assembly is improved.

Optionally, in some embodiments of the present disclosure, the first base is further provided with a first positioning portion, and the connecting member is provided with a first limiting portion matching the first positioning portion;

wherein in the locked state, the first positioning portion is inserted into the first limiting portion; wherein in the unlocked state, the first positioning portion is separated from the first limiting portion.

In the assembly component of an embodiment of the present disclosure, the stability of the connection between the connecting member and the first base can be further improved. In this embodiment, the first positioning portion may be in snap-fit connection with the first limiting portion, such that the connecting member and the first base are fixed together.

Optionally, in some embodiments of the present disclosure, one of the first positioning portion and the first limiting portion is a snap-bottom, and the other is a snap-slot.

In the assembly component of an embodiment of the present disclosure, one of the first positioning portion and the first limiting portion is a snap-bottom, and the other is a snap-slot, such that the first positioning portion can be in snap-fit connection with the first limiting portion.

Optionally, in some embodiments of the present disclosure, the second base is further provided with a second positioning portion, and the connecting member is provided with a second limiting portion matching the second positioning portion;

wherein in the locked state, the second positioning portion is inserted into the second limiting portion; wherein in the unlocked state, the second positioning portion is separated from the second limiting portion.

In the assembly component of an embodiment of the present disclosure, the stability of the connection between the connecting member and the second base can be further improved. In this embodiment, the second positioning portion may be in snap-fit connection with the second limiting portion, such that the connecting member and the second base are fixed together.

Optionally, in some embodiments of the present disclosure, one of the second positioning portion and the second limiting portion is a snap-bottom, and the other is a snap-slot.

In the assembly component of an embodiment of the present disclosure, one of the second positioning portion and the second limiting portion is a snap-bottom, and the other is a snap-slot, such that the second positioning portion can be in snap-fit connection with the second limiting portion.

Optionally, in some embodiments of the present disclosure, the connection assembly further includes a guiding rail, and the first base or the second base is slidably connected to the guiding rail.

In the assembly component of an embodiment of the present disclosure, the distance between the first base and the second base can be easily adjusted by the guiding rail. After the adjustment is completed, the first base or the second base slidably connected to the guiding rail is fixed on the guiding rail, such that the assembly efficient is effectively improved.

The embodiment of the present disclosure also provides an assembled display, including:

at least one first display screen;

at least one second display screen spliced with the corresponding first display screen; and the connecting assembly as described above, wherein the first base is fixed to a back side of the corresponding first display screen, the second base is fixed to a back side of the corresponding second display screen, and the connecting member connects the first base and the second base are locked together.

In the assembled display of an embodiment of the present disclosure, the first display screen and the second display screen are assembled by using the connecting assembly, such that the first display screen and the second display screen are reliably assembled together, and the first display screen and the second display screen are not easy to move, and workers do not need to repeatedly confirm the position, which effectively simplifies the installation process of the assembled display screen and improves the installation efficiency.

Optionally, in some embodiments of the present disclosure, the connection assembly further includes a guiding rail extending along the first direction;

wherein the guiding rail is provided on a back side of the first display screen, and the first base is slidably connected to the guiding rail; or, the guiding rail is provided on a back side of the second display screen, and the second base is slidably connected to the guiding rail.

In the assembled display of an embodiment of the present disclosure, the distance between the first base and the second base can be easily adjusted by the guiding rail. After the adjustment is completed, the first base or the second base slidably connected to the guiding rail is fixed on the guiding rail, such that the assembly efficient is effectively improved.

Beneficial Effects

The embodiment of the present disclosure adopts a connecting assembly and an assembled display, by using connecting assembly to assembly the first display screen and the second display screen. Therefore, the first display screen and the second display screen are reliably assembled together, the first display screen and the second display screen are not easy to shift, the workers do not need to confirm the position repeatedly, such that the installation process of the assembled display screen is effectively simplified and the installation efficiency is improved.

BRIEF DESCRIPTION OF THE SEVERAL VIEWS OF THE DRAWINGS

In order to illustrate the technical solution more clearly in the embodiments of the present disclosure, the following will briefly introduce the drawings used in the description of the embodiments. Obviously, the drawings in the following description are only some embodiments of the present disclosure for those skilled in the art, one can also obtain other drawings based on these drawings if any creative work is not needed.

DESCRIPTION OF SPECIFIC EMBODIMENTS OF THE INVENTION

Figure 1:
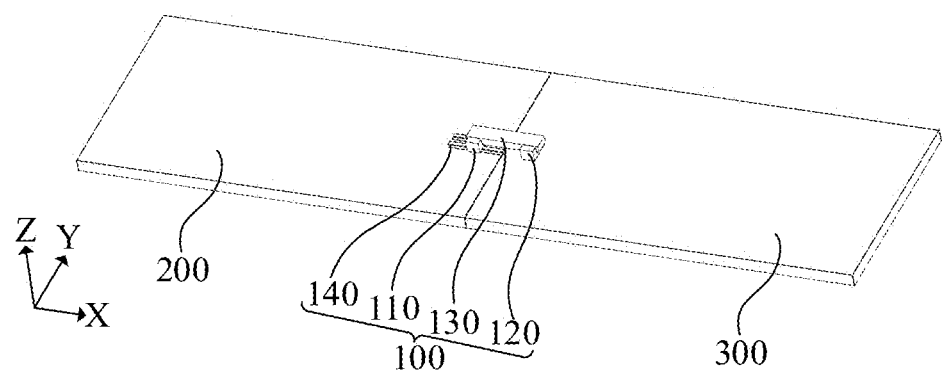
FIG. 1 is a schematic diagram of the three-dimensional structure of a first assembled display provided by an embodiment of the present disclosure.

The following will be combined with the drawings in the embodiment of the present disclosure, a clear and complete description of the technical solution in the embodiment of the present disclosure, obviously, the described embodiments are only a part of the embodiments of the present disclosure, not all the embodiment. Based on the embodiment in the present disclosure, all other embodiments obtained by those skilled in the art without creative work, all belong to the scope of protection of the present disclosure. In addition, it should be understood that the specific implementations described here are only used to illustrate and explain the present disclosure, not used to limit the present disclosure. In the present disclosure, in the absence of explanation to the contrary, the term such as "upper" and "lower" usually refers to the upper and lower positions of the device in actual use or working state. In particular, it is the direction of the drawing in the attached drawing; the "inner" and "outer" refer to the outline of the device.

The embodiment of the present disclosure provides a connecting assembly and an assembled display. Detailed descriptions are given below. It should be noted that the following description order of embodiments is not to be taken as a limitation on the preferred order of embodiments.

Please refer to FIG. 1, the embodiment of the present disclosure provides a connecting assembly 100, applied to an assembled display screen. Specifically, the assembled display screen comprises a first display screen 200 and a second display screen 300, the connecting assembly 100 is configured to position and assembly the first display screen 200 and the second display screen 300 such that the accuracy of splicing can be ensured, thereby the first display screen 200 and the second display screen 300 closely assembled together, which benefits to eliminate seams.

Figure 2:
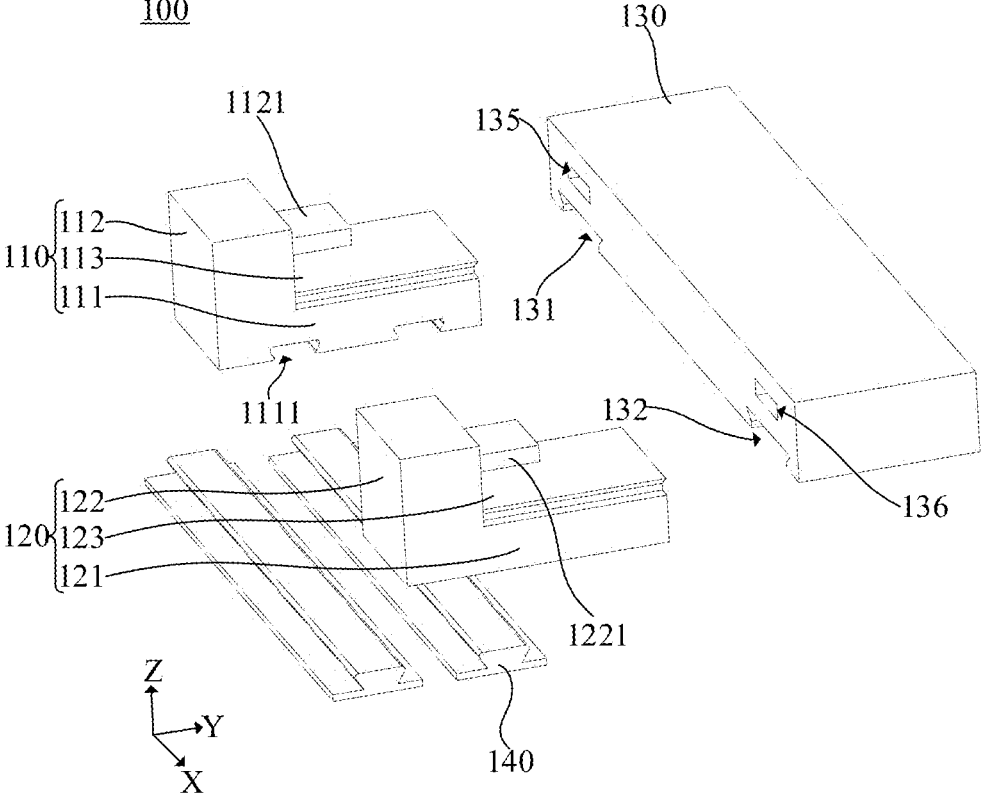
FIG. 2 is an explosion breakdown structural schematic diagram of a first connecting assembly provided by an embodiment of the present disclosure.

In particular, as shown in FIG. 1 and FIG. 2, the connecting assembly 100 comprises a first base 110, a second base 120 and a connecting member 130, the connecting member 130 is configured to lock the first base 110 and the second base 120 together. In the embodiment of the present disclosure, the first base 110 is fixed to a back side of the first display screen 200, and the second base 120 is fixed on a back side of the second display screen 300, and then the connecting member 130 is configured to lock the first base 110 and the second base 120 together, such that the first base 110 and the second base 120 are fixed together by the connecting member 130, in turn, the first display screen 200 and the second display screen 300 are assembled together.

In particular, the first base 110 is provided with a first guiding structure 113, the second base 120 is provided with a second guiding structure 123, the connecting member 130 is provided with a first matching structure 131 configured to match the first guiding structure 113 and a second matching structure 132 configured to match the second guiding structure 123; wherein in a locked state, the first guiding structure 113 is toothedly connected to the first matching structure 131, the second guiding structure 123 is toothedly connected to the second matching structure 132, wherein in an unlocked state, the first guiding structure 113 is separated from the first matching structure 131, the second guiding structure 123 is separated from the second matching structure 132.

For ease of description, the term "when the connecting member 130 locks the first base 110 and the second base 120 together" is defined that the arrangement direction of the first base 110 and the second base 120 is the first direction X, and the direction perpendicular to the first direction X is the second direction Y, the direction perpendicular to the first direction X and the second direction Y at the same time is the third direction Z. It should be understood that the angle between any two directions of the first direction X, the second direction Y and the third direction Z can be adjusted appropriately according to the actual situation and specific needs, as long as the angle between any two directions is not 0 degrees, there is no unique restriction here.

When the connecting member 130 locks the first base 110 and the second base 120 together, the first base 110 and the second base 120 are arranged along a first direction X, the first guiding structure 113 is toothedly connected to the first matching structure 131, the second guiding structure 123 is toothedly connected to the second matching structure 132. Through the arrangement, the connecting member 130 can define the relative position of the first base 110 and the second base 120 in the first direction X, thereby the first display screen 200 and the second display screen 300 are closely assembled together, which is benefits to eliminate seams.

In an embodiment of the present disclosure, the first display screen 200 and the second display screen 300 are reliably assembled together by using the connecting assembly 100 to assembly the first display screen 200 and the second display screen 300. Therefore, the first display screen 200 and the second display screen 300 are not easy to shift, the worker does not need to confirm the position repeatedly, such that the installation process of the assembled display screen is effectively simplified and the installation efficiency is improved.

Figure 3:
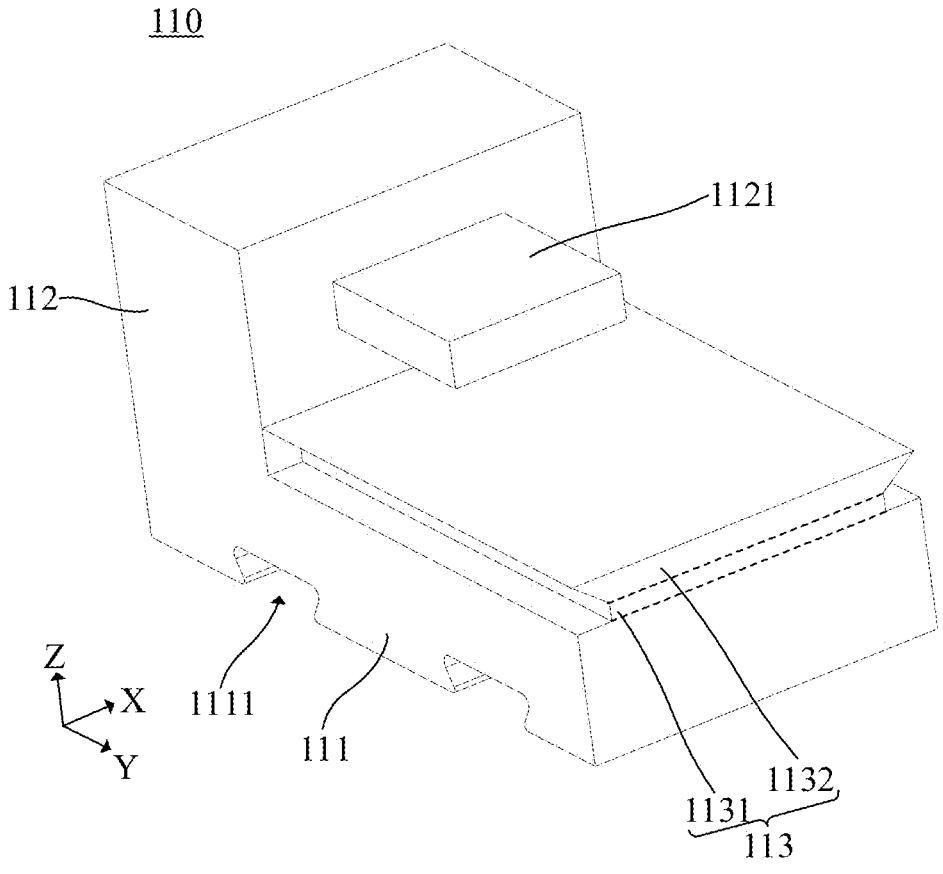
FIG. 3 is a schematic diagram of a three-dimensional structure of a first type of a first base provided by an embodiment of the present disclosure.
Figure 4:
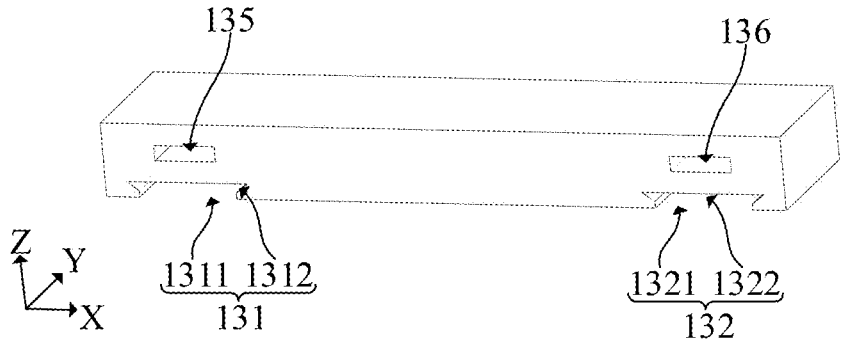
FIG. 4 is a schematic diagram of a three-dimensional structure of a first type of a connecting member provided by an embodiment of the present disclosure.
Figure 5:
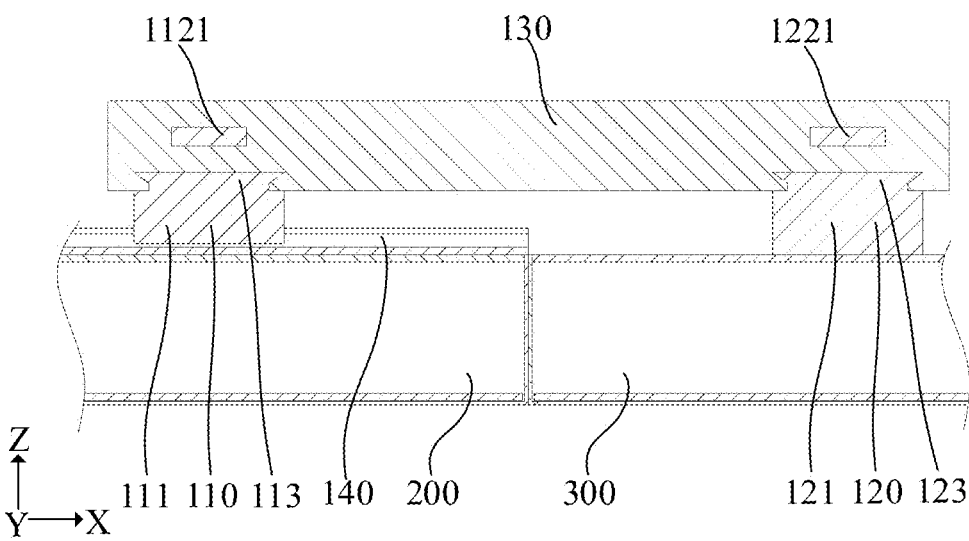
FIG. 5 is a schematic partial cross-sectional view of a first assembled display provided by an embodiment of the present disclosure.

In particular, as shown in FIG. 3 to FIG. 5, the first guiding structure 113 is a sliding rail, and the first matching structure 131 is a sliding trough; wherein in the locked state, the first guiding structure 113 is slidably connected to the first matching structure 131. In an assembly component of an embodiment of the present disclosure, the first guiding structure 113 is configured as a sliding rail and the first matching structure 131 is configured as a sliding trough, such that the first guiding structure 113 is slidably connected to the first matching structure 131. Under this structure, it is easy to assemble between the first base 110 and the connecting member 130, and this structure is simple.

In particular, as shown in FIG. 3 and FIG. 4, the first guiding structure 113 comprises a first connecting portion 1131 and a first toothing portion 1132, the first connecting portion 1131 is connected to the first base 110, the first toothing portion 1132 is connected to the first connecting portion 1131, and a width of the first toothing portion 1132 is greater than a width of the first connecting portion 1131. In this embodiment, combined with FIG. 1, FIG. 3 and FIG. 4, when the connecting member 130 is inserted into the first base 110, the first connecting portion 1131 is connected to one side of the first base 110 facing away from the first display screen 200 along a third direction Z, and the first toothing portion 1132 is connected to one side of the first connecting portion 1131 facing away from the first base 110 along the third direction Z.

It should be explained that in an embodiment of the present disclosure, the width refers to a distance along the first direction X, and the meaning of width will not be explained later.

In particular, as shown in FIG. 3 and FIG. 4, the first matching structure 131 comprises a first toothing groove 1312 and a first connecting groove 1311, the first toothing groove 1312 is configured to match the first toothing portion 1132, and a shape of the first toothing groove 1312 is adapted to a shape of the first toothing portion 1132, therefore the first toothing portion 1132 is inserted into the first toothing groove 1312; the first connecting groove 1311 is in communication with the first toothing groove 1312, the first connecting groove 1311 is configured to match the first connecting portion 1131, and a shape of the first connecting groove 1311 is adapted to the shape of a first connecting portion 1131, therefore the first connecting portion 1131 can be inserted into the first connecting groove 1311 exactly. In this embodiment, combined with FIG. 1, FIG. 5 and FIG. 6, when the connecting member 130 is inserted into the first base 110, the first connecting groove 1311 is provided on one side of the connecting member 130 close to the first display screen 200 along the third direction Z, the first engagement groove 1312 is provided on one side of the first connection groove 1311 away from the first display screen 200 along the third direction Z, and the first toothing groove 1312 is in communication with the first connecting groove 1311.

In the locked state, the first toothing portion 1132 is inserted into the first toothing groove 1312, and the first connecting portion 1131 is inserted into the first connecting groove 1311. Due to a width of the first toothing portion 1132 is greater than a width of the first connecting portion 1131, the first toothing portion 1132 cannot move from the first toothing groove 1312 to the first connecting groove 1311. Through the arrangement, it can prevent the first guiding structure 113 from being separated from the first matching structure 131 along the third direction Z, such that the reliability of the connecting assembly 100 is effectively improved.

In particular, as shown in FIG. 3 and FIG. 4, the width of the first toothing portion 1132 is gradually expanded from the first connecting portion 1131 to the first toothing portion 1132; accordingly, the width of the first toothing groove 1312 is gradually expanded from the first connecting groove 1311 to the first toothing groove 1312. In an embodiment of the present disclosure through the above arrangement, the contact area between the first toothing portion 1132 and a side wall of the first toothing groove 1312 can be increased, which effectively prevents the first guiding structure 113 from detaching from the first matching structure 131 along the third direction Z, such that the reliability of the connecting assembly 100 is improved.

In particular, as shown in FIG. 3 and FIG. 4, in the first base 110 of an embodiment of the present disclosure, a cross-sectional shape of the first toothing portion 1132 is an inverted trapezoid, accordingly, a cross-sectional shape of the first tooth groove 1312 is also an inverted trapezoid. It should be understood that the cross-sectional shape refers to a shape of a cross-section cut by a plane perpendicular to the second direction Y. Under this structure, the contact area between the first toothing portion 1132 and aside wall of the first toothing groove 1312 can be increased, which effectively prevents the first guiding structure 113 from detaching from the first matching structure 131 along the third direction Z, such that the reliability of the connecting assembly 100 is improved.

It can be understood that the cross-sectional shape of the first toothing portion 1132 can also be an inverted triangle, arc or other shapes according to the actual selection and specific needs setting, as long as it is ensured that the width of the first toothing portion 1132 is gradually expanded from the first connecting portion 1131 to the first toothing portion 1132, there is no unique restriction here.

Figure 6:
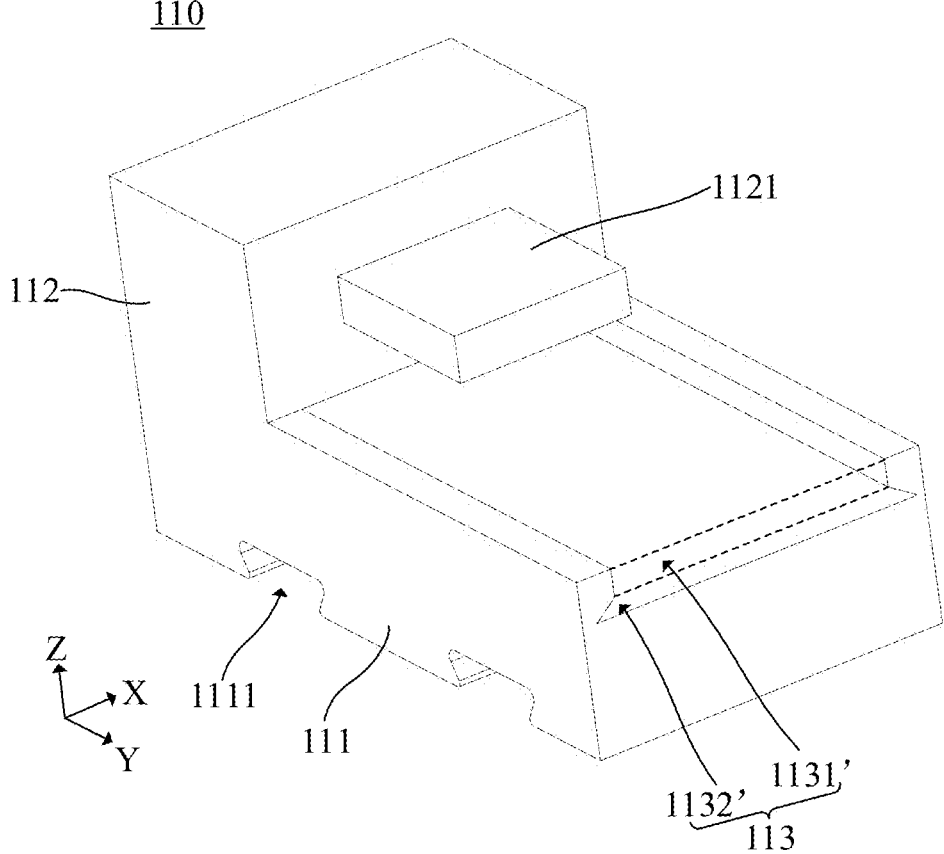
FIG. 6 is a schematic diagram of a three-dimensional structure of a second type of a first base provided by an embodiment of the present disclosure.
Figure 7:
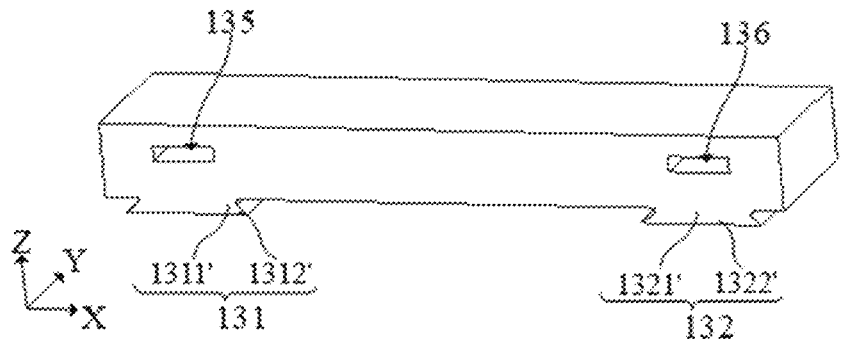
FIG. 7 is a schematic diagram of a three-dimensional structure of a second type of a connecting member provided by an embodiment of the present disclosure.

In particular, as shown in FIG. 6 and FIG. 7, the first guiding structure 113 is a sliding trough, and the first matching structure 131 is a sliding rail; wherein in the locked state, the first matching structure 131 is slidably connected to the first guiding structure 113. In the assembly component of an embodiment of the present disclosure, the first guiding structure 113 is configured as a sliding trough and the first matching structure 131 is configured as a sliding rail, therefore the first matching structure 131 is slidably connected to the first guiding structure 113. Under this structure, it is easy to assemble between the first base 110 and the connecting member 130, and this structure is simple.

In particular, as shown in FIG. 6, the first matching structure 131 comprises a first connecting portion 1311' and a first toothing portion 1312', the first connecting portion 1311' is connected to the connecting member 130, the first toothing portion 1312' is connected to the first connecting portion 1231', and a width of the first toothing portion 1312' is greater than a width of the first connecting portion 1311'. In this embodiment, when the connecting member 130 is inserted into the first base 110, the first connecting portion 1311' is connected to one side of the connecting member 130 close to the first display screen 200 along the third direction Z, and the first toothing portion 1312' is connected to one side of the first connecting portion 1311' close to the first display screen 200 along the third direction Z.

Combined with FIG. 6 and FIG. 7, the first guiding structure 113 comprises a first connecting groove 1131' and a first toothing groove 1132', the first toothing groove 1132' is configured to match the first toothing portion 1312', and a shape of the first toothing groove 1132' matches a shape of the first toothing portion 1312', therefore the first toothing portion 1312' can be inserted into the first toothing groove 1132'; the first connecting groove 1131' is in communication with the first toothing groove 1132', the first connecting groove 1131' is configured to match the first connecting portion 1311', and a shape of the first connecting groove 1131' matches a shape of the first connecting portion 1311', therefore the first connecting portion 1311' can be inserted into the first connecting groove 1131'. In this embodiment, when the connecting member 130 is inserted into the first base 110, the first connecting groove 1131' is provided on one side of the first base 110 away from the first display screen 200 along the third direction Z, the first toothing groove 1132' is provided on one side of the first connecting groove 1131' close to the first display screen 200 along the third direction Z, and the first toothing groove 1132' is in communication with the first connecting groove 1131'.

In the locked state, the first toothing portion 1312' is inserted into the first toothing groove 1132', and the first connecting portion 1311' is inserted into the first connecting groove 1131'. Due to a width of the first toothing portion 1312' is greater than a width of the first connecting portion 1311', the first toothing portion 1312' cannot move from the first toothing groove 1132' to the first connecting groove 1131'. Through the arrangement, it can prevent the first matching structure 131 from detaching from the first guiding structure 113 along the third direction Z, such that the reliability of the connecting assembly 100 is effectively improved.

In particular, as shown in FIG. 6 and FIG. 7, the width of the first toothing portion 1312' is gradually expanded from the first connecting portion 1311' to the first toothing portion 1312'; accordingly, the width of the first toothing groove 1132' is gradually expanded from the first connecting groove 1131' to the first toothing groove 1132'. In an embodiment of the present disclosure, through the above arrangement, the contact area between the first toothing portion 1312' and a side wall of the first toothing groove 1132' can be increased, which effectively prevents the first matching structure 131 from detaching from the first guiding structure 113 along the third direction Z, such that the reliability of the connecting assembly 100 is improved.

In particular, as shown in FIG. 6 and FIG. 7, in a first base 110 of an embodiment of the present disclosure, a cross-sectional shape of the first toothing portion 1312' is trapezoidal, accordingly, a cross-sectional shape of the first tooth groove 1132' is also trapezoidal. It should be understood that the cross-sectional shape refers to a shape of a cross-section cut by a plane perpendicular to the second direction Y. Under this structure, the contact area between the first toothing portion 1312' and a side wall of the first toothing groove 1132' can be increased, which effectively prevents the first matching structure 131 from detaching from the first guiding structure 113 along the third direction Z, such that the reliability of the connecting assembly 100 is improved.

It should be understood that, according to the actual selection and specific needs setting, the cross-sectional shape of the first toothing portion 1312' can also be triangular, arc-shaped or other shapes, as long as it is ensured that the width of the first toothing portion 1312' is gradually expanded from the first connecting portion 1311' to the first toothing portion 1312', there is no unique restriction here.

Figure 8:
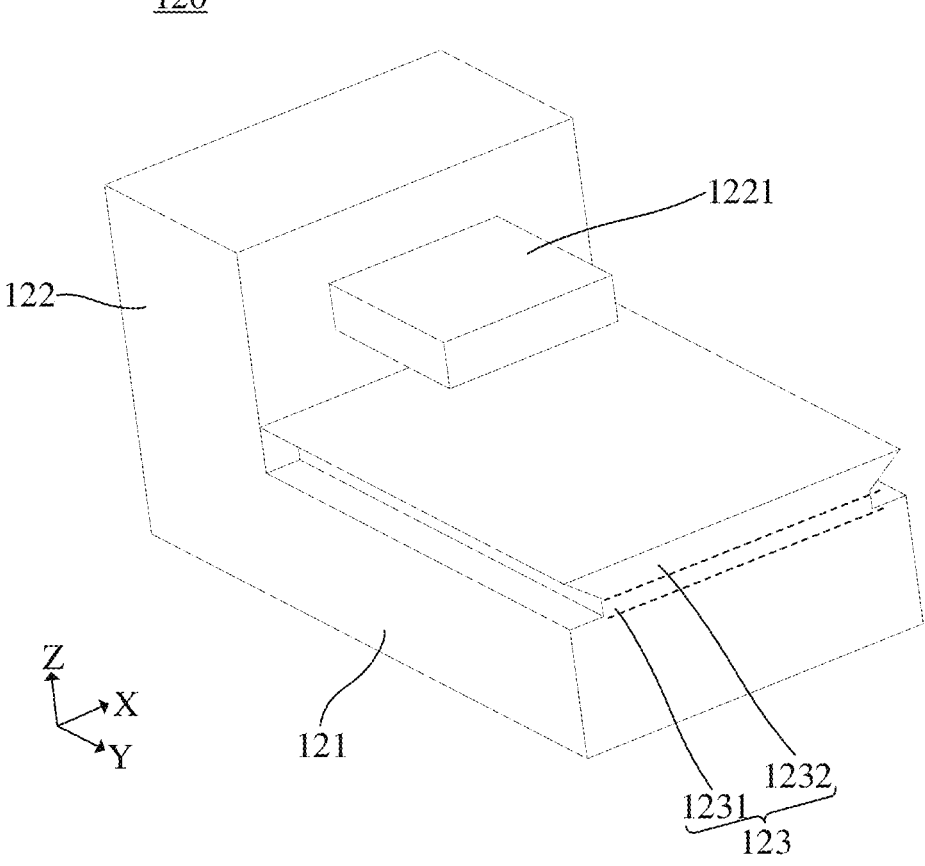
FIG. 8 is a schematic diagram of a three-dimensional structure of the first type of second base provided by the embodiment of the present disclosure.

In particular, as shown in FIG. 4, FIG. 5, and FIG. 8, the second guiding structure 123 is a slide rail, and the second matching structure 132 is a sliding trough; wherein in the locked state, the second guiding structure 123 is slidably connected to the second matching structure 132. In the assembly component of an embodiment of the present disclosure, the second guiding structure 123 is configured as a sliding rail and the second matching structure 132 is configured as a sliding trough, therefore the second guiding structure 123 is slidably connected to the second matching structure 132. Under this structure, it is easy to assemble between the second base 120 and the connecting member 130, this structure is simple.

In particular, as shown in FIG. 4 and FIG. 8, the second guiding structure 123 comprises a second connecting portion 1231 and a second toothing portion 1232, the second connecting portion 1231 is connected to the second base 120, the second toothing portion 1232 is connected to the second connecting portion 1231, and a width of the second toothing portion 1232 is greater than a width of the second connecting portion 1231. In this embodiment, when the connecting member 130 is inserted into the second base 120, the second connecting portion 1231 is connected to the side of the second base 120 away from the second display screen 300 along the third direction Z, and the second toothing portion 1232 is connected to the side of the second connecting portion 1231 away from the second base 120 along the third direction Z.

In particular, as shown in FIG. 4 and FIG. 8, the second matching structure 132 comprises a second toothing groove 1322 and a second connecting groove 1321, the second toothing groove 1322 is configured to match the second toothing portion 1232, and a shape of the second toothing groove 1322 is adapted to the shape of the second toothing portion 1232, therefore the second toothing portion 1232 can be inserted into the second toothing groove 1322; the second connecting groove 1321 is in communication with the second toothing groove 1322, the second connecting groove 1321 is configured to match the second connecting portion 1231, and a shape of the second connecting groove 1321 is adapted to the shape of the second connecting portion 1231, therefore the second connecting portion 1231 can be inserted into the second connecting groove 1321 exactly. In this embodiment, when the connecting member 130 is inserted into the second base 120, the second connecting groove 1321 is provided on one side of the connecting member 130 close to the second display screen 300 along the third direction Z, the second toothing groove 1322 is provided on one side of the second connecting groove 1321 away from the second display screen 300 along the third direction Z, and the second toothing groove 1322 is in communication with the second connecting groove 1321.

In the locked state, the second toothing portion 1232 is inserted into the second toothing groove 1322, and the second connecting portion 1231 is inserted into the second connecting groove 1321. Due to a width of the second toothing portion 1232 is greater than a width of the second connecting portion 1231, the second toothing portion 1232 cannot move from the second toothing groove 1322 to the second connecting groove 1321. Through the arrangement, it can prevent the second guiding structure 123 from detaching from the second matching structure 132 along the third direction Z, as such the reliability of the connecting assembly 100 is effectively improved.

In particular, as shown in FIG. 4 and FIG. 8, the width of the second toothing portion 1232 is gradually expanded from the second connecting portion 1231 to the second toothing portion 1232; accordingly, the width of the second toothing groove 1322 is gradually expanded from the second connecting groove 1321 to the second toothing groove 1322. In an embodiment of the present disclosure, through the above arrangement, the contact area between the second toothing portion 1232 and a side wall of the second toothing groove 1322 can be increased, which effectively prevents the second guiding structure 123 from detaching from the second matching structure 132 along the third direction Z, as such the reliability of the connecting assembly 100 is improved.

In particular, as shown in FIG. 4 and FIG. 8, in the second base 120 of an embodiment of the present disclosure, a cross-sectional shape of the second toothing portion 1232 is an inverted trapezoid, accordingly, a cross-sectional shape of the second tooth groove 1322 is also an inverted trapezoid. It should be understood that the cross-sectional shape refers to a shape of a cross-section cut by a plane perpendicular to the second direction Y. Under this structure, the contact area between the second toothing portion 1232 and a side wall of the second toothing groove 1322 can be increased, which effectively prevents the second guiding structure 123 from detaching from the second matching structure 132 along the third direction Z, such that the reliability of the connecting assembly 100 is improved.

It should be understood that, according to the actual selection and specific needs setting, the cross-sectional shape of the second toothing portion 1232 can also be an inverted triangle, arc or other shapes, as long as it is ensured that the width of the second toothing portion 1232 is gradually expanded from the second connecting portion 1231 to the second toothing portion 1232, there is no unique restriction here.

Figure 9:
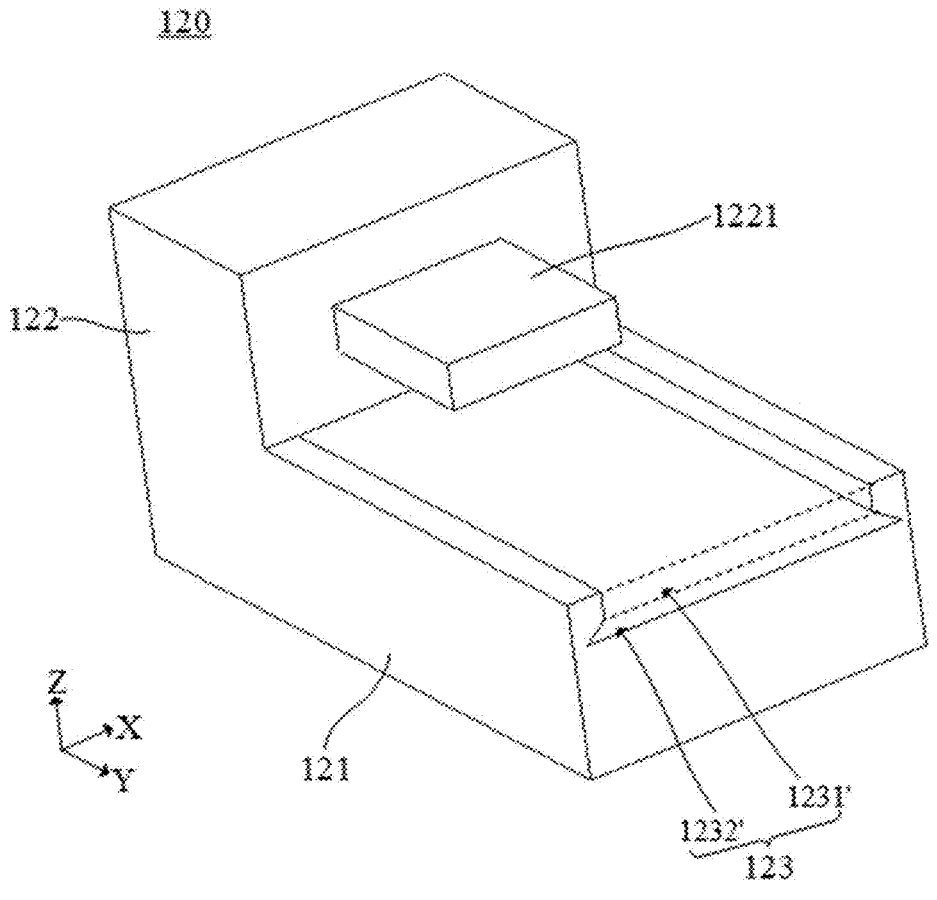
FIG. 9 is a schematic front view of a second type of a second base provided by an embodiment of the present disclosure.

In particular, as shown in FIG. 6 and FIG. 9, the second guiding structure 123 is a sliding trough, and the second matching structure 132 is a sliding rail; wherein in the locked state, the second matching structure 132 is slidably connected to the second guiding structure 123. In the assembly component of an embodiment of the present disclosure, the second guiding structure 123 is configured as a sliding trough, the second matching structure 132 is configured as a sliding rail, therefore the second matching structure 132 can be slidably connected to the second guiding structure 123. Under this structure, it is easy to assemble between the second base 120 and the connecting member 130, and this structure is simple.

In particular, as shown in FIG. 6 and FIG. 9, the second matching structure 132 comprises a second connecting portion 1321' and a second toothing portion 1322', the second connecting portion 1321' is connected to the connecting member 130, the second toothing portion 1322' is connected to the second connecting portion 1321', and a width of the second toothing portion 1322' is greater than a width of the second connecting portion 1321'. In this embodiment, when the connecting member 130 is inserted into the second base 120, the second connecting portion 1321' is connected to one side of the connecting member 130 close to the second display screen 300 along the third direction Z, and the second toothing portion 1322' is connected to the side of the second connecting portion 1321' close to the second display screen 300 along the third direction Z.

In particular, as shown in FIG. 6 and FIG. 9, the second guiding structure 123 comprises a second toothing groove 1232' and a second connecting groove 1231', the second toothing groove 1232' is configured to match the second toothing portion 1322', and a shape of the second toothing groove 1232' matches a shape of the second toothing portion 1322', therefore the second toothing portion 1322' can be inserted into the second toothing groove 1232'; the second connecting groove 1231' is in communication with the second toothing groove 1232', the second connecting groove 1231' is configured to match the second connecting portion 1321', and a shape of the second connecting groove 1231' matches a shape of the second connecting portion 1321', and the second connecting portion 1321' can be inserted into the second connecting groove 1231' exactly. In this embodiment, when the connecting member 130 is inserted into the second base 120, the second connecting groove 1231' is provided on one side of the second base 120 away from the second display screen 300 along the third direction Z, the second toothing groove 1232' is provided on one side of the second connecting groove 1231' close to the second display screen 300 along the third direction Z, and the second toothing groove 1232' is in communication with the second connecting groove 1231'.

In the locked state, the second toothing portion 1322' is inserted into the second toothing groove 1232', and the second connecting portion 1321' is inserted into the second connecting groove 1231'. Due to a width of the second toothing portion 1322' is greater than a width of the second connecting portion 1321', the second toothing portion 1322' cannot move from the second toothing groove 1232' to the second connecting groove 1231'. Through the arrangement, it can prevent the second matching structure 132 from separating from the second guiding structure 123 along the third direction Z, such that the reliability of the connecting assembly 100 is effectively improved.

In particular, as shown in FIG. 6 and FIG. 9, the width of the second toothing portion 1322' is gradually expanded from the second connecting portion 1321' to the second toothing portion 1322'; accordingly, the width of the second toothing groove 1232' is gradually expanded from the second connecting groove 1231' to the second toothing groove 1232'. In an embodiment of the present disclosure, through the above arrangement, the contact area between the second toothing portion 1322' and a side wall of the second toothing groove 1232' can be increased, which effectively prevents the second guiding structure 123 from detaching from the second matching structure 132 along the third direction Z, such that the reliability of the connecting assembly 100 is improved.

In particular, as shown in FIG. 6 and FIG. 9, in the second base 120 of an embodiment of the present disclosure, a cross-sectional shape of the second toothing portion 1322' is trapezoidal, accordingly, a cross-sectional shape of the second tooth groove 1232' is also an inverted trapezoid. It should be understood that the cross-sectional shape refers to a shape of a cross-section cut by a plane perpendicular to the second direction Y. Under this structure, the contact area between the second toothing portion 1322' and a side wall of the second toothing groove 1232' can be increased, which effectively prevents the second guiding structure 123 from detaching from the second matching structure 132 along the third direction Z, such that the reliability of the connecting assembly 100 is improved.

It should be understood that, according to the actual selection and specific needs setting, the cross-sectional shape of the second toothing portion 1322' can also be triangular, arc-shaped or other shapes, as long as it is ensured that the width of the second toothing portion 1322' is gradually expanded from the second connecting portion 1321' to the second toothing portion 1322', there is no unique restriction here.

In particular, as shown in FIG. 2 and FIG. 7, the first base 110 is also provided with a first positioning portion 1121, the connecting member 130 is provided with a first limiting portion 135 matching the first positioning portion 1121; wherein in the locked state, the first positioning portion 1121 is in snap-fit connection with the first limiting portion 135; wherein in the unlocked state, the first positioning portion 1121 is separated from the first limiting portion 135. Under this structure, the stability of the connection between the connecting member 130 and the first base 110 can be further improved. In this embodiment, the first positioning portion 1121 can be in snap-fit connection with the first limiting portion 135, therefore the connecting member 130 and the first base 110 are fixed together, and of course according to the actual selection and specific needs setting, the connecting member 130 and the first base 110 can be fixed together in other ways, there is no unique restriction here.

In particular, one of the first positioning portion 1121 and the first limiting portion 135 is a snap-bottom, the other is a snap slot, therefore, the first positioning portion 1121 can be in snap-fit connection with the first limiting portion 135.

In particular, as shown in FIG. 2 and FIG. 7, the second base 120 is also provided with a second positioning portion 1221, the connecting member 130 is provided with a second limiting portion 136 matching the second positioning portion 1221; wherein in the locked state, the second positioning portion 1221 is in snap-fit connection with the second limiting portion 136; wherein in the unlocked state, the second positioning portion 1221 is separated from the second limiting portion 136. Under this structure, the stability of the connection between the connecting member 130 and the second base 120 can be further improved. In this embodiment, the second positioning portion 1221 can be in snap-fit connection with the second limiting portion 136, therefore, the connecting member 130 and the second base 120 are fixed together, and of course according to the actual selection and specific needs setting, the connecting member 130 and the second base 120 can be fixed together in other ways, there is no unique restriction here.

In particular, one of the second positioning portion 1221 and the second limiting portion 136 is a snap-bottom, the other is a snap slot, therefore the second positioning portion 1221 can be in snap-fit connection with the second limiting portion 136.

In particular, as shown in FIG. 2 to FIG. 4, the first base 110 comprises a first support base 111 and a first positioning base 112 connected to the first support base 111, and the first guiding structure 113 is provided on the first support base 111. When the connecting member 130 is inserted into the first connecting member 130, the first positioning seat 112 and the first guiding structure 113 are arranged on the same side of the first support seat 111 along the third direction Z, and the first positioning seat 112 is arranged on the side of the first guiding structure 113 away from the connecting member 130 along the second direction Y, the first positioning base 112 abuts against the connecting member 130, thereby the structure between the connecting member 130 and the first base 110 can be made more compact, such that the reliability of the connecting assembly 100 is effectively improved. In this embodiment, the first positioning portion 1121 is provided on the first positioning seat 112.

In particular, as shown in FIG. 2, FIG. 8 and FIG. 9, the second base 120 comprises a second support base 121 and a second positioning base 122 connected to the second support base 121, and the second guiding structure 123 is provided on the second support base 121. When the connecting member 130 is inserted into the second connecting member 130, the second positioning seat 122 and the second guiding structure 123 are arranged on the same side of the second support seat 121 along the third direction Z, and the second positioning seat 122 is arranged on the side of the second guiding structure 123 away from the connecting member 130 along the second direction Y, the second positioning seat 122 abuts against the connecting member 130, thereby the structure between the connecting member 130 and the second base 120 can be made more compact, such that the reliability of the connecting assembly 100 is effectively improved. In this embodiment, the second positioning portion 1221 is provided on the second positioning seat 122.

In particular, as shown in FIG. 1, FIG. 2, FIG. 10 and FIG. 11, the connecting assembly 100 also comprises a guiding rail 140, and the first base 110 or the second base 120 is slidably connected to the guiding rail 140; when the connecting member 130 is inserted into the first base 110 and the second base 120, the guiding rail 140 extends along the first direction X. In this embodiment, a distance between the first base 110 and the second base 120 can be easily adjusted by the guiding rail 140. The first base 110 or the second base 120 slidably connected to the guiding rail 140 is fixed on the guiding rail 140 after adjusting, such that the assembly efficiency is effectively improved.

As shown in FIG. 1 and FIG. 2, when the first base 110 is slidably connected to the guiding rail 140, the second base 120 can be directly fixed on a back side of the second display screen 300 by glue, screws or other means, the guiding rail 140 can be directly fixed on a back side of the first display screen 200 by glue, screws or other methods, the guiding rail 140 extends along the first direction X, and the guiding rail 140 is provided with a first base 110. When the first display screen 200 and the second display screen 300 are assembled together, the first base 110 can be slid on the guiding rail 140 by pushing the first base 110, such that a distance between the first base 110 and the second base 120 is adjusted, and then the first base 110 on the guiding rail 140 is fix ed by glue, screws or other means. Finally, the connecting member 130 is connected to the first base 110 and the second base 120, and the assembly of the first display screen 200 and the second display screen 300 is completed.

Figure 10:
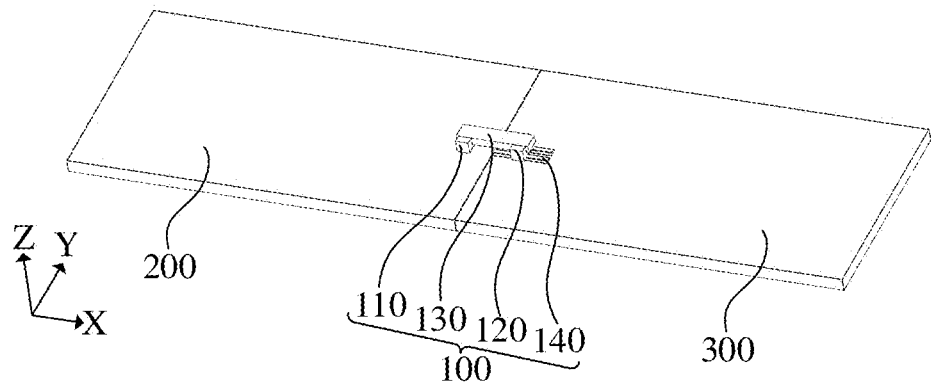
FIG. 10 is a schematic diagram of a three-dimensional structure of a second assembled display provided by an embodiment of the present disclosure.
Figure 11:
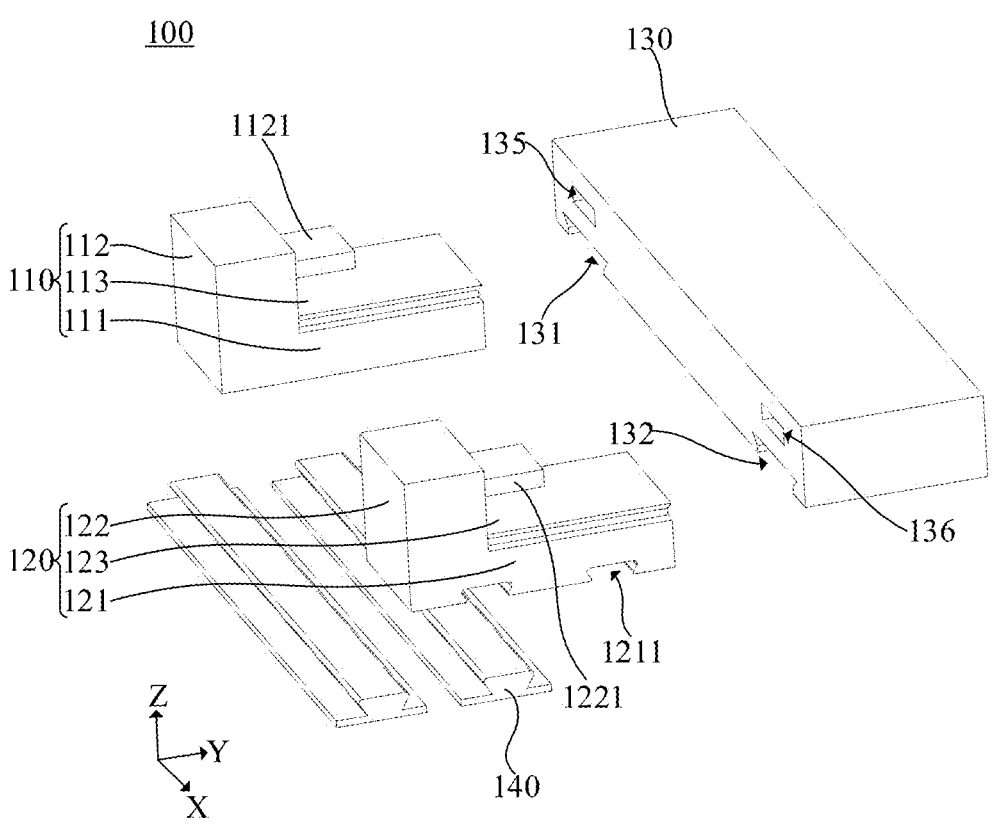
FIG. 11 is an exploded and exploded structural schematic diagram of a second connecting assembly provided by an embodiment of the present disclosure.

As shown in FIG. 10 and FIG. 11, when the second base 120 is slidably connected to the guiding rail 140, the first base 110 can be directly fixed to a back side of the first display screen 200 by glue, screws or other means, the guiding rail 140 can be directly fixed to a back side of the second display screen 300 by glue, screws or other means, the guiding rail 140 extends along the first direction X, and the guiding rail 140 is provided with a second base. When the first display screen 200 and the second display screen 300 are assembled together, the second base 120 can be slid on the guiding rail 140 by pushing the second base 120, such that a distance between the second base 120 and the first base 110 is adjusted, and then the second base 120 on the guiding rail 140 is fixed by glue, screws or other means. Finally, the connecting member 130 is connected to the second base 120 and the first base 110, and the assembly of the first display screen 200 and the second display screen 300 is completed.

In particular, as shown in FIG. 1 and FIG. 2, when the first base 110 is slidably connected to the guiding rail 140, the first base 110 is provided with a third sliding trough 1111, and the guiding rail 140 is inserted into the third sliding trough 1111, therefore the first base 110 is slidably connected to the guiding rail 140. In this embodiment, the third sliding groove 1111 is provided on the first support base 111.

In particular, as shown in FIG. 10 and FIG. 11, when the second base 120 is slidably connected to the guiding rail 140, the second base 120 is provided with a third sliding trough 1211, and the guiding rail 140 is inserted into the third sliding trough 1211, therefore the second base 120 is slidably connected to the guiding rail 140. In this embodiment, the third sliding groove 1211 is provided on the second supporting base 121.

In particular, in an embodiment of the present disclosure, as shown in FIG. 4, the first matching structure 131 and the second matching structure 132 of the connecting member 130 are both sliding grooves; as shown in FIG. 7, the first matching structure 131 and the second matching structure 132 of the connecting member 130 are both sliding rails. In addition, of course according to the actual selection and specific needs setting, one of the first matching structure 131 and the second matching structure 132 can be a sliding groove, the other is a slide rail, as long as it is ensured that the first matching structure 131 and the first guiding structure 113 are toothed and connected, the second matching structure 132 and the second guiding structure 123 can be toothed and connected, there is no unique restriction here.

Figure 12:
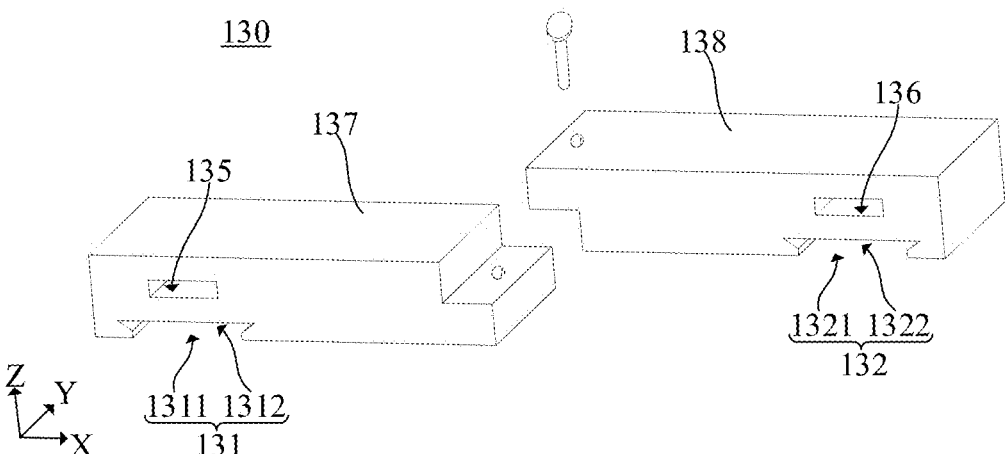
FIG. 12 is a schematic diagram of a three-dimensional structure of a third type of a connecting member provided by an embodiment of the present disclosure.

In particular, in the above embodiments, the connecting member 130 is a one-piece structure, the extension directions of the first guiding structure 113 and the second guiding structure 123 are the same. In addition, according to the actual selection and specific needs setting, the connecting member 130 can also be a split structure, such that the first guiding structure 113 and the second guiding structure 123 are extended in different directions, which benefits to improve the stability of the connecting assembly 100. As shown in FIG. 12, the connecting member 130 may include a first connecting member 137 corresponding to the first base 110 and a second connecting member 138 matching the second base 120, the first matching structure 131 and the first limiting portion 135 are provided on the first connecting member 137, the second matching structure 132 and the second limiting portion 136 are provided on the second connecting member 138. Under this embodiment, the first connecting member 137 is after inserted into the first base 110, and the second connecting member 138 is inserted into the second base 120, and screws or other fixed connection methods is used to fix the first connecting assembly 137 and the second connecting assembly 138 together, therefore the first display screen 200 and the second display screen 300 are assembled together.

In an embodiment shown in FIG. 12, although only the first matching structure 131 and the second matching structure 132 are both shown in a form of a sliding trough according to the actual selection and specific needs setting, the first matching structure 131 and the second matching structure 132 may both be in a form of a sliding rail; or, one of the first matching structure 131 and the second matching structure 132 is a slide rail, the other is in the form of a sliding trough, as long as it is ensured that the first matching structure 131 and the first guiding structure 113 are toothed and connected, the second matching structure 132 and the second guiding structure 123 can be toothed and connected, there is no unique restriction here.

Please refer to FIG. 1 and FIG. 10, the embodiments of the present disclosure also provide a assembled display, comprising at least one first display screen 200, at least one second display screen 300 and the above-mentioned connecting assembly 100. The second display screen 300 is assembled with the corresponding first display screen 200, the first base 110 is fixed on a back side of the corresponding first display screen 200, the second base 120 is fixed on a back side of the corresponding second display screen 300, and the connecting member 130 is inserted into the first base 110 and the second base 120. Because the assembled display of this embodiment comprises all the technical solutions of the above-mentioned embodiment, therefore it also is provided with all the beneficial effects of the above-mentioned embodiments, the beneficial effects of assembled displays will not be repeated here.

In particular, as shown in FIG. 1, FIG. 2, FIG. 10 and FIG. 11, the connecting assembly 100 further comprises a guiding rail 140, and the first base 110 or the second base 120 is slidably connected to the guiding rail 140; when the connecting member 130 is inserted into the first base 110 and the second base 120, the guiding rail 140 extends along the first direction X. In this embodiment, a distance between the first base 110 and the second base 120 can be easily adjusted by the guiding rail 140, and the first base 110 or the second base 120 slidably connected to the guiding rail 140 is fixed on the guiding rail 140 after adjusting, such that the assembly efficiency is effectively improved.

As shown in FIG. 1 and FIG. 2, when the first base 110 is slidably connected to the guiding rail 140, the second base 120 can be directly fixed on a back side of the second display screen 300 by glue, screws or other means, the guiding rail 140 can be directly fixed on a back side of the first display screen 200 by glue, screws or other methods, the guiding rail 140 extends along the first direction X, and the guiding rail 140 is provided with a first base 110. When the first display screen 200 and the second display screen 300 are assembled together, the first base 110 can be slid on the guiding rail 140 by pushing the first base 110, such that a distance between the first base 110 and the second base 120 is adjusted, and then the first base 110 on the guiding rail 140 is fixed by glue, screws or other means. Finally, the connecting member 130 is connected to the first base 110 and the second base 120, and the assembly of the first display screen 200 and the second display screen 300 is completed.

As shown in FIG. 10 and FIG. 11, when the second base 120 is slidably connected to the guiding rail 140, the first base 110 can be directly fixed to a back side of the first display screen 200 by glue, screws or other means, the guiding rail 140 can be directly fixed to a back side of the second display screen 300 by glue, screws or other means, the guiding rail 140 extends along the first direction X, and the guiding rail 140 is provided with a second base 120. When the first display screen 200 and the second display screen 300 are assembled together, the second base 120 can be slid on the guiding rail 140 by pushing the second base 120, such that a distance between the second base 120 and the first base 110 is adjusted, and then the second base 120 on the guiding rail 140 is fixed by glue, screws or other means. Finally, the connecting member 130 is connected to the second base 120 and the first base 110, and the assembly of the first display screen 200 and the second display screen 300 is completed.

In particular, as shown in FIG. 1 and FIG. 2, when the first base 110 is slidably connected to the guiding rail 140, the first base 110 is provided with a third sliding trough 1111, and the guiding rail 140 is inserted into the third sliding trough 1111, therefore the first base 110 is slidably connected to the guiding rail 140. In this embodiment, the third sliding groove 1111 is provided on the first support base 111.

In particular, as shown in FIG. 10 and FIG. 11, when the second base 120 is slidably connected to the guiding rail 140, the second base 120 is provided with a third sliding trough 1111, and the guiding rail 140 is inserted into the third sliding trough 1111, therefore the second base 120 is slidably connected to the guiding rail 140. In this embodiment, the third sliding groove 1111 is provided on the second support-ing base 121.

The connecting assembly and assembled display provided by the embodiment of the present disclosure are described in detail above. In this article, specific examples are used to explain the principles and implementation of the present disclosure. The description of the above embodiment is only used to help understand the method and core concept of the present disclosure; at the same time, for those skilled in the art, according to the concept of the present disclosure, there will be changes in the specific implementation and scope of application, to sum up, the content of this manual should not be construed as a limitation on the present disclosure.

What is claimed is:

1. A connecting assembly, comprising:
a first base, wherein the first base comprises a first support base, a first positioning base connected with the first support base, and a first guiding structure provided on the first support base;
a second base, wherein the second base comprises a second support base, a second positioning base con-nected with the second support base, and a second guiding structure provided on the second support base; and
a connecting member configured to lock the first base and the second base together, wherein the connecting mem-ber is provided with a first matching structure config-ured to match the first guiding structure and a second matching structure configured to match the second guiding structure;
wherein the first positioning base is arranged at a side of the first guiding structure away from the connecting member, and the second positioning base is arranged at a side of the second guiding structure away from the connecting member;
wherein in a locked state, the first guiding structure is toothedly connected to the first matching structure, the second guiding structure is toothedly connected to the second matching structure, and the first positioning base and the second positioning base are in direct contact with the connecting member; wherein in an unlocked state, the first guiding structure is separated from the first matching structure, and the second guid-ing structure is separated from the second matching structure.

2. The connecting assembly according to claim 1, wherein the first guiding structure is a sliding rail, and the first matching structure is a sliding trough, wherein in the locked state, the first guiding structure is slidably connected to the first matching structure.

3. The connecting assembly according to claim 2, wherein the first guiding structure comprises a first connecting por-tion and a first toothing portion, the first connecting portion is connected to the first base, the first toothing portion is connected to the first connecting portion, and a width of the first toothing portion is greater than a width of the first connecting portion;
wherein the first matching structure comprises a first toothing groove and a first connecting groove, the first toothing groove is configured to match the first toothing portion, the first connecting groove is in communica-tion with the first toothing groove, and the first con-necting groove is configured to match the first connect-ing portion; and
wherein in the locked state, the first toothing portion is inserted into the first toothing groove, and the first connecting portion is inserted into the first connecting groove.

4. The connecting assembly according to claim 3, wherein the width of the first toothing portion is gradually expanded from the first connecting portion to the first toothing portion, the width of the first toothing groove is gradually expanded from the first connecting groove to the first toothing groove.

5. The connecting assembly according to claim 1, wherein the first guiding structure is a sliding trough, and the first matching structure is a sliding rail, wherein in the locked state, the first matching structure is slidably connected to the first guiding structure.

6. The connecting assembly according to claim 5, wherein the first matching structure comprises a first connecting portion and a first toothing portion, the first connecting portion is connected to the first base, the first toothing portion is connected to the first connecting portion, and a width of the first toothing portion is greater than a width of the first connecting portion;
wherein the first guiding structure comprises a first tooth-ing groove and a first connecting groove, the first toothing groove is configured to match the first toothing portion, the first connecting groove is in communica-tion with the first toothing groove, and the first con-necting groove is configured to match the first connect-ing portion; and
wherein in the locked state, the first toothing portion is inserted into the first toothing groove, and the first connecting portion is inserted into the first connecting groove.

7. The connecting assembly according to claim 6, wherein the width of the first toothing portion is gradually expanded from the first connecting portion to the first toothing portion, and the width of the first toothing groove is gradually expanded from the first connecting groove to the first toothing groove.

8. The connecting assembly according to claim 1, wherein the second guiding structure is a sliding rail, and the second matching structure is a sliding trough, wherein in the locked state, the second guiding structure is slidably connected to the second matching structure.

9. The connecting assembly according to claim 8, wherein the second guiding structure comprises a second connecting portion and a second toothing portion, the second connecting portion is connected to the second base, the second toothing portion is connected to the second connecting portion, and a width of the second toothing portion is greater than a width of the second connecting portion;

wherein the second matching structure comprises a second toothing groove and a second connecting groove, the second toothing groove is configured to match the second toothing portion, the second connecting groove is in communication with the second toothing groove, and the second connecting groove is configured to match the second connecting portion;

wherein in the locked state, the second toothing portion is inserted into the second toothing groove, and the second connecting portion is inserted into the second connecting groove.

10. The connecting assembly according to claim 9, wherein the width of the second toothing portion is gradually expanded from the second connecting portion to the second toothing portion, and the width of the second toothing groove is gradually expanded from the second connecting groove to the second toothing groove.

11. The connecting assembly according to claim 1, wherein the second guiding structure is a sliding trough, and the second matching structure is a sliding rail, wherein in the locked state, the second matching structure is slidably connected to the second guiding structure.

12. The connecting assembly according to claim 11, wherein the second matching structure comprises a second connecting portion and a second toothing portion, the second connecting portion is connected to the second base, the second toothing portion is connected to the second connecting portion, and a width of the second toothing portion is greater than a width of the second connecting portion;

wherein the second guiding structure comprises a second toothing groove and a second connecting groove, the second toothing groove is configured to match the second toothing portion, the second connecting groove is in communication with the second toothing groove, and the second connecting groove is configured to match the second connecting portion;

wherein in the locked state, the second toothing portion is inserted into the second toothing groove, and the second connecting portion is inserted into the second connecting groove.

13. The connecting assembly according to claim 12, wherein the width of the second toothing portion is gradually expanded from the second connecting portion to the second toothing portion, the width of the second toothing groove is gradually expanded from the second connecting groove to the second toothing groove.

14. The connecting assembly according to claim 1, wherein the first base is further provided with a first positioning portion, and the connecting member is provided with a first limiting portion matching the first positioning portion;

wherein in the locked state, the first positioning portion is inserted into the first limiting portion; wherein in the unlocked state, the first positioning portion is separated from the first limiting portion.

15. The connecting assembly according to claim 1, wherein the second base is further provided with a second positioning portion, and the connecting member is provided with a second limiting portion corresponding to the second positioning portion;

wherein in the locked state, the second positioning portion is inserted into the second limiting portion; wherein in the unlocked state, the second positioning portion is separated from the second limiting portion.

16. The connecting assembly according to claim 1, wherein the connecting assembly further comprises a guiding rail, the first base or the second base is slidably connected to the guiding rail.

17. An assembled display, comprising:

at least one first display screen;

at least one second display screen, assembled with corresponding one of the first display screen; and the connecting assembly according to claim 1, wherein the first base is fixed to a back side of the corresponding first display screen, the second base is fixed on a back side of corresponding one of the second display screen, and the connecting member locks the first base and the second base together.

18. The assembled display according to claim 17, wherein the connecting assembly further comprises a guiding rail;

wherein the guiding rail is disposed on the back side of the first display screen, and the first base is slidably connected to the guiding rail; or the guiding rail is disposed on the back side of the second display screen, and the second base is slidably connected to the guiding rail.

* * * * *